United States Patent
Troeger et al.

(10) Patent No.: US 12,259,474 B2
(45) Date of Patent: Mar. 25, 2025

(54) METHOD FOR CAPTURING AT LEAST PARTICLE COMPOSITIONS IN A MONITORING REGION WITH AN OPTICAL DETECTION APPARATUS, AND DETECTION APPARATUS

(71) Applicant: Valeo Schalter und Sensoren GmbH, Bietigheim-Bissingen (DE)

(72) Inventors: Hans-Martin Troeger, Kronach Neuses (DE); Faraz Qureishi, Kronach Neuses (DE); Harsha Mathur, Kronach Neuses (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 981 days.

(21) Appl. No.: 17/285,737

(22) PCT Filed: Oct. 15, 2019

(86) PCT No.: PCT/EP2019/077925
§ 371 (c)(1),
(2) Date: Apr. 15, 2021

(87) PCT Pub. No.: WO2020/078983
PCT Pub. Date: Apr. 23, 2020

(65) Prior Publication Data
US 2022/0003871 A1 Jan. 6, 2022

(30) Foreign Application Priority Data
Oct. 17, 2018 (DE) .................. 10 2018 125 715.5

(51) Int. Cl.
*G01S 17/58* (2006.01)
*G01N 15/0205* (2024.01)
*G01S 17/931* (2020.01)

(52) U.S. Cl.
CPC .......... *G01S 17/58* (2013.01); *G01N 15/0205* (2013.01); *G01S 17/931* (2020.01)

(58) Field of Classification Search
None
See application file for complete search history.

(56) References Cited

U.S. PATENT DOCUMENTS

| | | | | |
|---|---|---|---|---|
| 2005/0207943 A1* | 9/2005 | Puzey | ...................... | C12Q 1/04 422/82.05 |
| 2007/0076201 A1* | 4/2007 | Babin | ...................... | G01S 17/95 356/338 |

(Continued)

FOREIGN PATENT DOCUMENTS

| | | |
|---|---|---|
| DE | 102006030734 A1 | 1/2008 |
| DE | 102009028578 A1 | 2/2011 |
| DE | 10346951 B4 | 4/2011 |
| DE | 102012105379 B3 | 7/2013 |

OTHER PUBLICATIONS

Satat Guy et al: "Towards photography through realistic fog", 2018IEEE International Conference on Computational Photography (ICCP), IEEE, May 4, 2018 (May 4, 2018), Seiten 1-10, XP033352256, DOI: 10.1109/ICCPHOT.2018.8368463 (10 pages).
International Search Report and Written Opinion in corresponding International Application No. PCT/EP2019/077925, mailed Jan. 14, 2020 (13 pages).
German Search Report in corresponding German Application No. 10 2018 125 715.5, dated Sep. 26, 2019 (5 pages).

*Primary Examiner* — Hovhannes Baghdasaryan
(74) *Attorney, Agent, or Firm* — Osha Bergman Watanabe & Burton LLP

(57) ABSTRACT

A method for capturing at least particle compositions (21) in a monitoring region (14) that exhibit a temporally dynamic behaviour with an optical detection apparatus (12), and an optical detection apparatus (12) are described. In the method, during at least one measurement, optical transmis- (Continued)

sion signals (22) are transmitted into the monitoring region (14) and transmission signals (22) that are reflected at particle targets (28) of any particle compositions (21) present in the monitoring region (14) are received as particle reflection signals (30). The presence of dynamic particle compositions (21) is concluded from the particle reflection signals (30). At least two measurements are performed with a temporal distance. A particle target density or a variable characterizing the particle target density is ascertained for at least one partial volume (48) of the monitoring region (14) from the particle reflection signals (30) of each measurement. If the particle target density (52) or the variable characterizing it from the at least two measurements should differ by more than a prescribable or prescribed tolerance, it is concluded that the particle reflection signals (30) from the at least one partial volume are caused by the reflection of the transmission signals (22) at dynamic particle compositions (21).

12 Claims, 5 Drawing Sheets

(56) References Cited

U.S. PATENT DOCUMENTS

| | | | |
|---|---|---|---|
| 2010/0194574 A1* | 8/2010 | Monk | G01N 15/06 |
| | | | 340/627 |
| 2018/0136337 A1 | 5/2018 | Zohar et al. | |
| 2018/0209887 A1* | 7/2018 | Ray | B64D 15/20 |

* cited by examiner

METHOD FOR CAPTURING AT LEAST PARTICLE COMPOSITIONS IN A MONITORING REGION WITH AN OPTICAL DETECTION APPARATUS, AND DETECTION APPARATUS

TECHNICAL FIELD

The invention relates to a method for capturing at least particle compositions in a monitoring region of a vehicle that exhibit a temporally dynamic behaviour with an optical detection apparatus of the vehicle, wherein, in the method, during at least one measurement,
optical transmission signals are transmitted into the monitoring region and transmission signals that are reflected at particle targets of any particle compositions present in the monitoring region are received as particle reflection signals,
the presence of dynamic particle compositions is concluded from the particle reflection signals.

The invention furthermore relates to an optical detection apparatus for capturing at least dynamic particle compositions in a monitoring region,
having at least one transmitter with which optical transmission signals can be transmitted into the monitoring region,
having at least one receiver with which transmission signals that are reflected at particle targets of any particle compositions present in the monitoring region can be received in the form of particle reflection signals,
having at least one evaluation device with which the presence of dynamic particle compositions can be concluded from the particle reflection signals or variables characterizing them.

PRIOR ART

DE 10 2009 028 578 A1 discloses a method for vicinity capturing using at least one LiDAR sensor system, in which a capturing region of the vicinity is scanned with a scanning beam and radiation reflected at objects in the vicinity is captured and evaluated. The intensity of the backscattered radiation of a scanning beam is captured as a function of the distance (intensity curve). Furthermore, a threshold value for the amplitude of the intensity curve is prescribed. A disturbance in the propagation conditions is concluded if the prescribed threshold value is exceeded at least over a prescribed distance interval. In the case of corresponding weather conditions, such as wetness on the road, it is likely that the disturbance is caused by a cloud of spray that has been swirled up by a moving object.

It is the object of the invention to design a method and a detection apparatus of the type mentioned in the introductory part, with which a determination of particle compositions captured in the monitoring region of the detection apparatus can be improved.

DISCLOSURE OF THE INVENTION

This object is achieved with the method according to the invention in that
at least two measurements are performed with a temporal distance,
a particle target density or a variable characterizing the particle target density is ascertained for at least one partial volume of the monitoring region from the particle reflection signals of each measurement,
if the particle target density or the variable characterizing it from the at least two measurements should differ by more than a prescribable or prescribed tolerance, it is concluded that the particle reflection signals from the at least one partial volume are caused by the reflection of the transmission signals at dynamic particle compositions.

According to the invention, the temporal development of the particle target density in at least one partial volume of the monitoring region is considered. From the temporal development of the particle target density, a conclusion is drawn as to whether the captured particles belong to a particle composition having a temporally dynamic behaviour or a temporally uniform behaviour.

For particle compositions having a temporally uniform behaviour, the particle target density between the measurements changes slightly or not at all. For particle compositions having a temporally dynamic behaviour, a clear change in the particle target density is capturable between the measurements. When assessing whether the behaviour is a temporally dynamic behaviour or a temporally uniform behaviour, corresponding tolerances with respect to the particle target densities can be taken into account, where this is appropriate.

For the at least one partial volume, a particle target density difference of the particle target densities existing there or variables characterizing them can be advantageously ascertained during the at least two measurements. If the particle target density lies below a prescribed or prescribable limit, for which a corresponding tolerance can have been taken into account, it is possible to conclude that the particle reflection signals from the at least one partial volume are caused by the reflection of the transmission signals at dynamic particle compositions. If this is not the case, it is possible to conclude that the particle reflection signals are caused by the reflection of the transmission signals at particle compositions having a temporally uniform behaviour.

The particle compositions that are ascertainable with the invention may be precipitation, in particular rain, snow, sleet, hail or the like, or spray, fog, smoke, smog or the like. Extensive investigations carried out along the way to the invention have found that the particle target density in the case of spray, fog, smoke or smog has a temporally dynamic behaviour. Spray, fog, smoke and smog are thus dynamic particle compositions within the meaning of the invention. In contrast, the particle target density in the case of precipitation, in particular rain, snow, hail, sleet or the like, has a temporally uniform behaviour. Precipitation, in particular rain, snow, hail, sleet or the like, within the meaning of the invention is thus a particle composition having a temporally uniform behaviour.

Spray is water that is swirled up from the ground. The water can be swirled up in particular by vehicles and/or strong wind.

A particle target is a point on the surface of a particle at which optical transmission signals can be reflected and transmitted back in the form of particle reflection signals. A particle can have one or more such particle targets.

Advantageously, the detection apparatus can also be used to capture objects in the monitoring region. The objects can be in particular vehicles, people, animals, obstacles, potholes, roadway boundaries, such as crash barriers, or the like. To capture the objects, transmission signals that are reflected at object targets can be captured in the form of object reflection signals. Using corresponding means, it is possible to ascertain from the object reflection signals object information, in particular the direction, distance and/or speed of an object relative to the detection apparatus and/or properties of the object. An object target is a point on the surface of an object at which optical transmission signals can be reflected and transmitted back in the form of object reflection signals. An object can have one or more object targets.

Advantageously, the optical detection apparatus can operate according to a time-of-flight method, in particular a light pulse time-of-flight method. Optical detection apparatuses operating in accordance with the light pulse time-of-flight method can be embodied and referred to as time-of-flight (TOF) systems, light detection and ranging (LiDAR) systems, laser detection and ranging (LaDAR) systems or the like. Here, a time of flight from transmission of a transmission signal, in particular a light pulse, using at least one transmitter and the receipt of the corresponding reflected transmission signal, that is to say the reflection signal, using at least one receiver is measured, and a distance between the detection apparatus and a particle target or an object target is ascertained therefrom.

Advantageously, the optical detection apparatus can be designed as a scanning system. In this context, a monitoring region can be scanned with transmission signals. For this purpose, the corresponding transmission signals can be panned over the monitoring region with respect to their propagation direction. In this case, at least one deflection device, in particular a scanning device, a deflection mirror device or the like, can be used.

Advantageously, the optical detection apparatus can be designed as a laser-based distance measurement system. The laser-based distance measurement system can have, as the light source of at least one transmitter, at least one laser, in particular a diode laser. The at least one laser can be used to transmit in particular pulsed transmission signals. The laser can be used to emit transmission signals in frequency ranges that are visible or not visible to the human eye. Accordingly, at least one receiver can have a detector designed for the frequency of the transmitted light, in particular an (avalanche) photodiode, a diode array, a CCD array or the like. The laser-based distance measurement system can advantageously be a laser scanner. A laser scanner can be used to scan a monitoring region with an in particular pulsed laser beam.

The invention is used in a vehicle, in particular a motor vehicle. The invention can advantageously be used in a land-based vehicle, in particular a passenger vehicle, a lorry, a bus, a motorcycle or the like, an aircraft and/or a watercraft. The invention can also be used in vehicles that can be operated autonomously or at least partially autonomously.

The detection apparatus can advantageously be connected to at least one electronic control device of a vehicle, in particular a driver assistance system and/or a chassis control system and/or a driver information device and/or a parking assistance system and/or a gesture recognition or the like or can be part of such a device, system or apparatus. In this way, at least partially autonomous operation of the vehicle can be made possible.

Knowledge of the condition of the road is useful in particular in the case of vehicles so as to influence the driving behaviour in particular with the aid of a driver assistance system. For example, a wet or slippery road will significantly increase the expected braking distance. In order to be able to better assess the condition of the road, it is helpful to be able to better identify the particle composition captured using the detection apparatus. In particular, an estimation relating to the spray due to vehicles driving in front and/or the estimation relating to current quantities of precipitation can be used to assess the driving environment, in particular the condition of the road. The invention can be used to better differentiate the particle compositions. In particular spray can thus be distinguished from precipitation. Overall, driving safety can thus be improved.

If in an advantageous configuration of the method the particle target densities ascertained during the at least two measurements or variables characterizing them possibly correspond to one another within a prescribable or prescribed tolerance, it is possible to conclude that the particle reflection signals are caused by the reflection of the transmission signals at particle compositions having a temporally uniform behaviour. In this way, in particular spray can be distinguished from precipitation, in particular rain, snow, hail or sleet.

In a further advantageous configuration of the method, it is possible for ascertaining the particle target densities or variables characterizing them to normalize a number of particles captured during the measurements with respect to a prescribed partial volume of the monitoring region. The normalized particle target densities or the variables characterizing them from the measurements can thus be directly compared with one another.

In a further advantageous configuration of the method, at least one portion of the monitoring region can be divided into prescribed partial volumes and the particle target densities or variables characterizing them can be ascertained in each case separately for the partial volumes. In this way, a corresponding portion of the monitoring region can be checked in a spatially resolved manner for corresponding particle compositions. In this case, different particle compositions can be captured in each case in the partial volumes. For example, it is possible that mainly precipitation, which generates temporally uniform particle target densities, is captured in a partial volume. It is possible that in a different partial volume mainly spray is captured, which generates temporally dynamic particle target densities.

In a further advantageous configuration of the method, at least one portion of the monitoring region can be assigned to a virtual grid, wherein the grid cells of the grid represent partial volumes of the monitoring region. In this way, a reproducible spatial assignment can be realized. The monitoring region can be assigned to the corresponding grids according to a classification of the reflection signals.

The virtual grid can advantageously be given as a surface grid or as a spatial grid. The virtual grid can advantageously be based on a Cartesian coordinate system, a polar coordinate system or another type of coordinate system.

In a further advantageous configuration of the method, the reflection signals from the monitoring region can be classified at least as particle reflection signals and as object reflection signals, which are caused by objects in the monitoring region. In this way, objects can be distinguished from particles. It is thus possible to ascertain the portion of the monitoring region in which objects are present.

In a further advantageous configuration of the method, a particle target density or variable characterizing the latter can be ascertained for at least one partial volume of the monitoring region located in a free space of the monitoring region from which no object reflection signals are captured that are caused by reflections of optical transmission signals at objects. The viewing range of the detection apparatus in the free space of the monitoring region is not limited by any objects. Said free space is in expert circles also referred to as "visible space".

Advantageously, the checking of the particle target density can be limited to distances of approximately between 2 m and 20 m from the detection apparatus. In this way, the amount of data can be reduced and the processing time can thus be shortened.

In a further advantageous configuration of the method, the monitoring region can be scanned with the transmission signals during the at least one measurement. In this way, the monitoring region can be checked in a spatially resolved manner for particles and/or objects.

In a further advantageous configuration of the method, particle reflection signals and possibly object reflection signals can be received and converted into corresponding electrical signals that can be further processed accordingly. In this way, the optical reflection signals can be electrically evaluated after their conversion into electrical signals in particular with the aid of electronic and/or electrical components.

In a further advantageous configuration of the method,
- for a plurality of partial volumes, in each case a particle target density difference of the particle target densities existing there or variables characterizing them can be ascertained during a plurality of measurements,
- a stochastic variance can be formed from the particle target density differences of the relevant partial volumes,
- the variance can be compared with a prescribed or prescribable threshold value,
- if the variance is greater than the threshold value, it can be concluded that the particle reflection signals from the plurality of partial volumes are mainly caused by particle compositions having a temporally dynamic behaviour,
- if this is not the case, it can be concluded that the particle reflection signals from the plurality of partial volumes are mainly caused by particle compositions having a temporally uniform behaviour. In this way, it is possible to ascertain the type of particle compositions that prevails in the monitoring region.

Furthermore, the object is achieved according to the invention in the case of the optical detection apparatus by way of the detection apparatus having means for performing the method according to the invention.

In an advantageous embodiment, the detection apparatus can have means for scanning the monitoring region with the aid of the transmission signals. In this way, the monitoring region can be monitored in a spatially resolved manner for particles and/or objects.

The detection apparatus can advantageously have at least one deflection device with which the transmission signals can be deflected, in particular with which their direction can be panned, so as to scan the monitoring region. This deflection device or a different deflection device can be suitable for deflecting the reflection signals from the monitoring region to at least one receiver of the detection apparatus.

Moreover, the features and advantages indicated in connection with the method according to the invention and the detection apparatus according to the invention and the respective advantageous configurations and embodiments thereof apply in a mutually corresponding manner and vice versa. The individual features and advantages can of course be combined with one another, wherein further advantageous effects can occur that go beyond the sum of the individual effects.

BRIEF DESCRIPTION OF THE DRAWINGS

Further advantages, features and details of the invention are apparent from the following description, in which an exemplary embodiment of the invention will be explained in more detail with reference to the drawing. A person skilled in the art will also expediently consider individually the features which have been disclosed in the drawing, the description and the claims in combination, and combine them to form further meaningful combinations. In the drawing, schematically:

In the figures, identical components are provided with the same reference numerals.

EMBODIMENT(S) OF THE INVENTION

Figure 1:
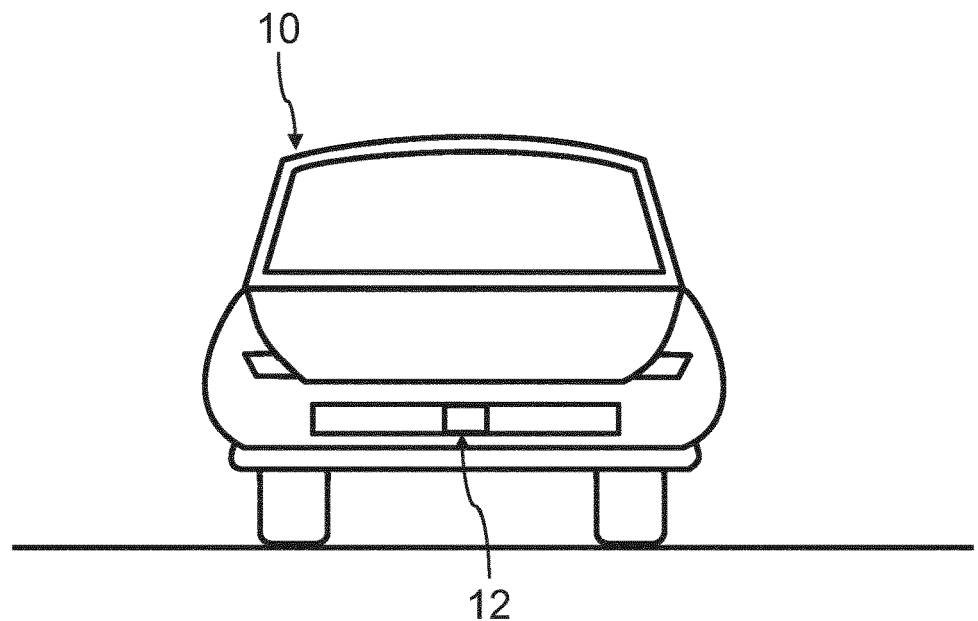
FIG. 1 shows a front view of a vehicle with a laser scanner for monitoring a monitoring region in front of the vehicle in the direction of travel, which laser scanner is connected to a driver assistance system of the vehicle.
Figure 2:
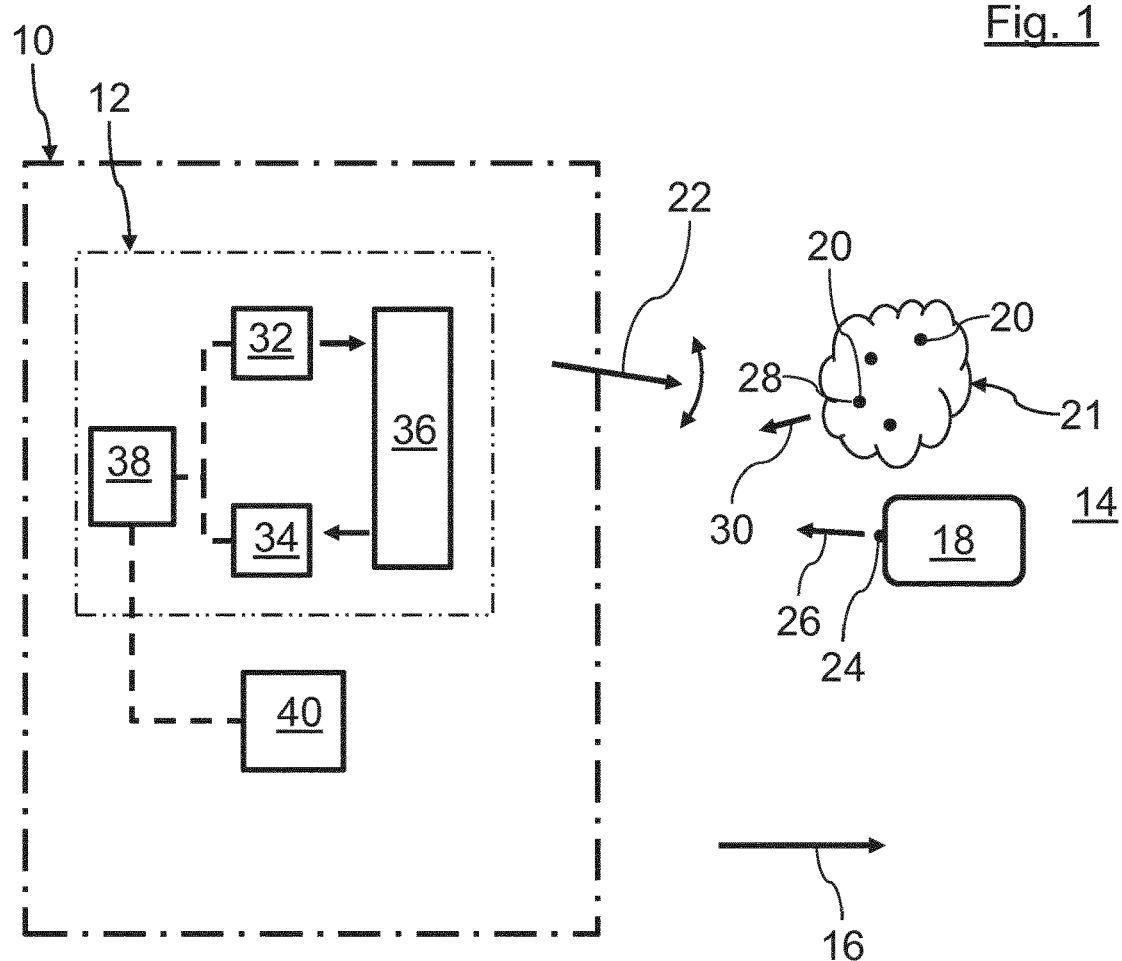
FIG. 2 shows a functional illustration of the vehicle with the laser scanner and the driver assistance system from FIG. 1.

FIG. 1 illustrates a vehicle 10 by way of example in the form of a passenger vehicle in the front view. The vehicle 10 comprises a scanning optical detection apparatus by way of example in the form of a laser scanner 12. The laser scanner 12 is arranged by way of example in the front bumper of the vehicle 10. FIG. 2 illustrates a few parts, for example the laser scanner 12, of the vehicle 10 in the form of a functional illustration.

The laser scanner 12 can be used to monitor a monitoring region 14 in the driving direction 16 in front of the vehicle 10 for objects 18 and particles 20. For this purpose, the monitoring region 14 can be scanned with corresponding optical transmission signals 22 using the laser scanner 12.

Objects 18 can be other vehicles, people, animals, obstacles, potholes, roadway boundaries, the road surface or the like.

The particles 20 occur in the form of a particle composition 21 in the form of precipitation, for example rain, snow, hail, sleet or the like, or in the form of spray, fog, smog, smoke or the like. Accordingly, the particles 20 can be raindrops, water drops, drops of fog or mist, hailstones, snowflakes, smoke particles, smog particles, dust particles, grains of sand or the like.

If an object 18 is present in the monitoring region 14, the corresponding transmission signals 22 are reflected at object targets 24 of the object 18 in the form of object reflection signals 26 and are transmitted back to the laser scanner 12.

An object target 24 is a region of the surface of an object 18 at which transmission signals 22 can be reflected. Each object 18 can have one or more such object targets 24, which can be captured with the transmission signals 22.

If particles 20 are present in the monitoring region 14, the corresponding transmission signals 22 are reflected at particle targets 28 of the particles 20 in the form of particle reflection signals 30 and are transmitted back to the laser scanner 12. A particle target 28 is a region of the surface of a particle 20 at which transmission signals 22 can be reflected. Each particle 20 can have one or more such particle targets 28, which can be captured with the transmission signals 22.

The laser scanner 12 operates according to what is referred to as a time-of-flight method, in which a time of flight between the emission of a transmission signal 22 and the reception of an object reflection signal 26 can be captured, and a distance, a speed and/or a direction of the object 18 relative to the vehicle 10 can be determined therefrom. If a particle reflection signal 30 is received, it is accordingly possible to determine a distance, a speed and/or a direction of the particle 20 relative to the vehicle 10. The respective position can be determined from the distance and the direction of an object 18 or of a particle 20.

The laser scanner 12 has a transmitter 32 for transmitting the transmission signals 22, a receiver 34 for receiving the object reflection signals 26 and the particle reflection signals 30, a deflection device 36, for example in the form of a deflection mirror device, for deflecting the transmission signals 22, the object reflection signals 26 and the particle reflection signals 30, and a control and evaluation device 38 for controlling the transmitter 32, the receiver 34 and the deflection device 36 and for evaluating object reflection signals 26 and particle reflection signals 30 that have been received.

The transmitter 32 has, for example, a laser diode with which the transmission signals 22 are transmitted in the form of laser pulses.

The beam directions of the transmission signals 22 are panned into the monitoring region 14 using the deflection device 36 so that the monitoring region 14 can be scanned with the transmission signals 22. Furthermore, the returning object reflection signals 26 and particle reflection signals 30 are steered onto the receiver 34 using the deflection device 36.

The receiver 34 has an optoelectronic component, for example a photodiode, a CCD chip or the like, with which the optical object reflection signals 26 and the particle reflection signals 30 can be converted into corresponding electrical signals. The electrical signals can be processed accordingly with the control and evaluation device 38.

The laser scanner 12, or rather the control and evaluation device 38, is functionally connected to a driver assistance system 40. The driver assistance system 40 can be used to control driving functions of the vehicle 10, for example steering, braking, a motor or the like, or at least to support the control thereof or a driver of the vehicle 10. The vehicle 10 can be operated autonomously or partially autonomously with the aid of the driver assistance system 40.

During the operation of the laser scanner 12, the transmitter 32 is controlled by the control and evaluation device 38 such that transmission signals 22 in the form of laser pulses are transmitted thereby. The transmission signals 22 are deflected by the deflection device 36 into the monitoring region 14. In this case, the transmission direction of the transmission signals 22 on the outlet side of the deflection device 36 is panned into a direction, for example in the horizontal direction, such that the monitoring region 14 is scanned with successive transmission signals 22. In this way, the azimuth of a captured object 18 or of a captured particle 20 can be determined. Optionally, the transmission direction of the transmission signals 22 can be additionally panned in a further, preferably orthogonal, direction using the deflection device 36 such that the monitoring region 14 can also be scanned accordingly in this direction. In this way, the elevation of the object 18 or of the particle 20 can additionally be determined.

During a measurement with the laser scanner 12, which can also be referred to as a scan, the viewing angle defining the monitoring region 14 is scanned once in its entirety. During the operation of the laser scanner 12, a plurality of measurements are performed successively such that the monitoring region 14 can be scanned in its entirety in each case at different time points.

Figure 3:
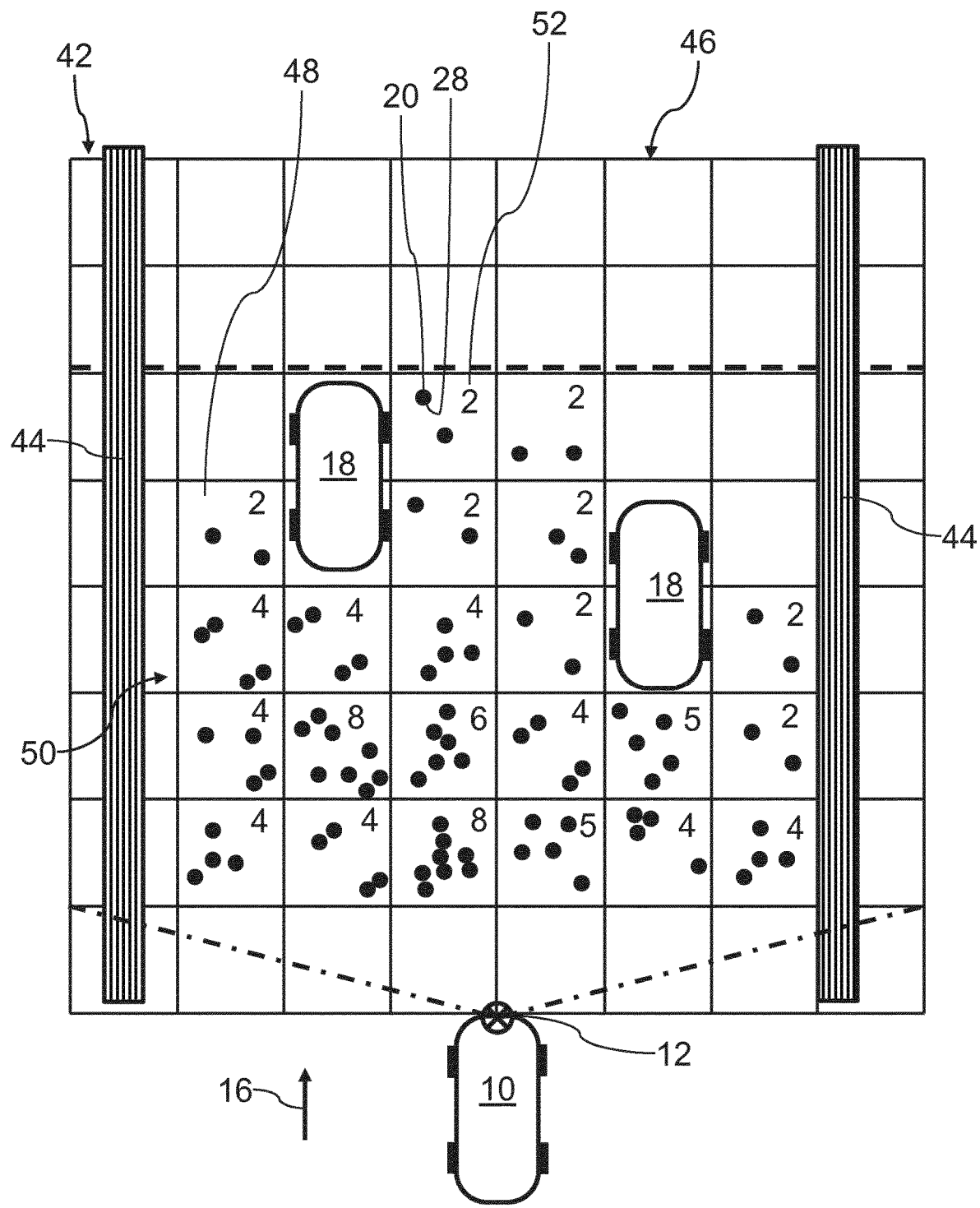
FIG. 3 shows a plan view of the vehicle from FIG. 1 in a driving situation on a road in the rain during a measurement with the laser scanner, wherein two further vehicles, which generate spray, are located in the monitoring region and wherein the monitoring region is assigned to a virtual grid and respective particle target densities are indicated in the grid cells.
Figure 4:
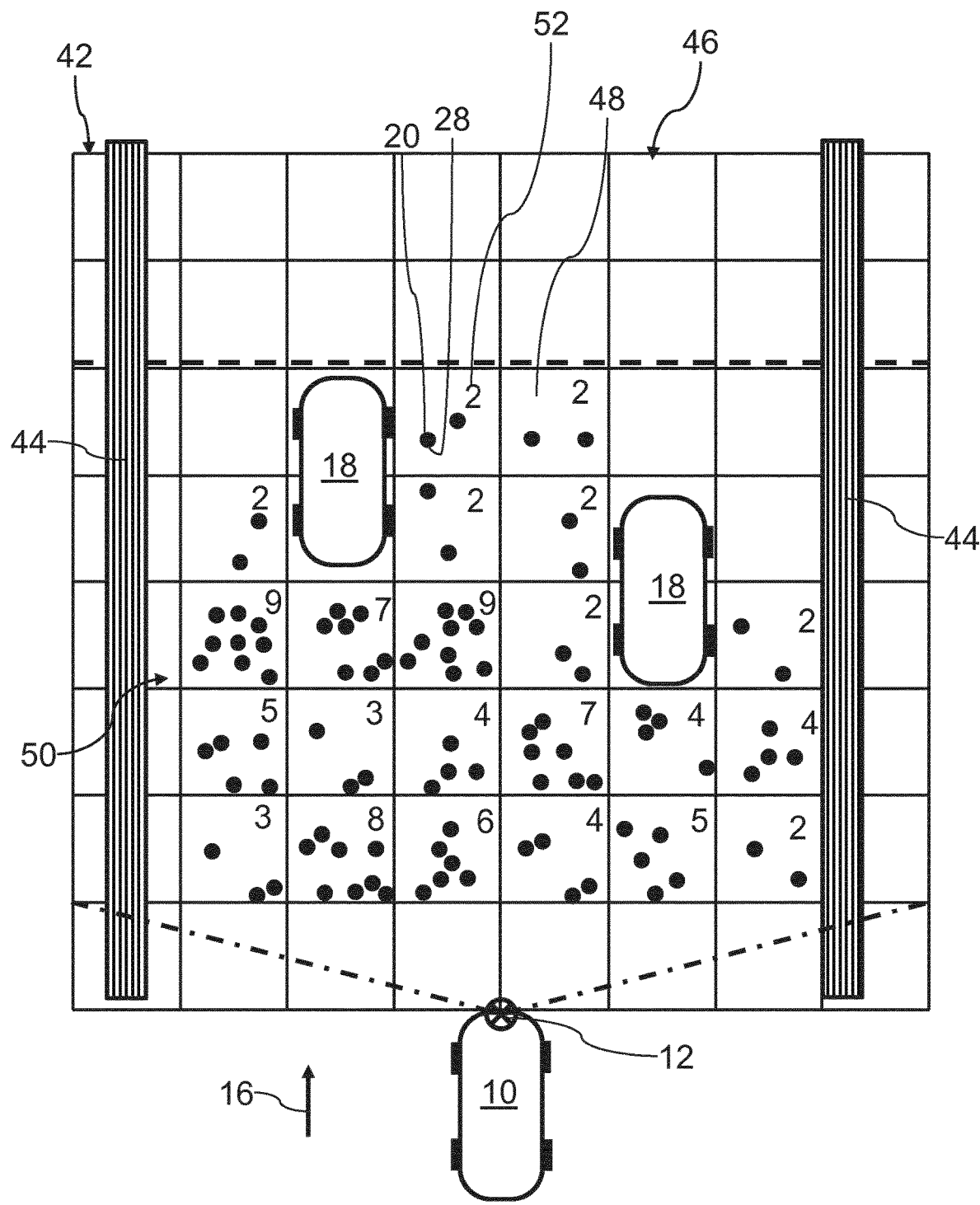
FIG. 4 shows the plan view of the vehicle from FIG. 3 during a later measurement.

FIGS. 3 and 4 show a driving situation of the vehicle 10 during successive measurements with the laser scanner 12. The vehicle 10 is located on a road 42, which is delimited in the driving direction 16 on the right and on the left by way of crash barriers 44. The crash barriers 44 and the road surface are objects 18 within the meaning of the invention. Two objects 18 in the form of further vehicles are located in the driving direction 16 in front of the vehicle 10. During the driving situation, it is raining. The water on the road is swirled up due to the objects 18, specifically the vehicles, driving ahead and appears in the form of spray. The raindrops of the precipitation and the water drops of the spray are indicated, as particles 20, in the form of dots. For the sake of better comprehension, each object 18 in the described exemplary embodiment has for example only one object target 24 and each particle 20 has only one particle target 28.

FIGS. 3 to 6 moreover show a virtual grid 46 based on a Cartesian coordinate system, to which the monitoring region 14 is assigned. Alternatively, it is also possible to use a surface grid for example based on polar coordinates. The grid 46 divides the monitoring region 14 into partial volumes 48, which are defined by the grid cells of the grid 46. The monitoring region 14 is assigned to the grid 46, as will be explained further below, in the control and evaluation device 38.

During the respective measurements, the object reflection signals 26 of the objects 18 and the particle reflection signals 30 of the particles 20 are received by the receiver 34 and converted into corresponding electrical signals.

The control and evaluation device 38 is used to evaluate the corresponding electrical signals. For the sake of better comprehension, the terms "object reflection signals 26", "particle reflection signal 30", "particle target densities 52" and "particle target density difference 54" are also used in the description of the processing of the electrical signals using the control and evaluation device 38, even though the corresponding electrical signals are here meant to refer to respectively characterizing variables.

During the evaluation, the reflection signals received with the receiver 34 are classified. In this case, the reflection signals caused by objects 18 are classified as object reflection signals 26. The reflection signals caused by particles 20 are classified as particle reflection signals 30. The positions of the objects 18, specifically of the vehicles driving ahead, of the crash barriers 44 and of the road surface, are ascertained from the object reflection signals 26.

Method steps for capturing the particle compositions 21 with which rain can be distinguished from spray will be described below.

A free space 50 is ascertained from the positions of the objects 18. The free space 50 is the region in the monitoring region 14 that is not obscured or blocked by objects 18, viewed from the laser scanner 12, meaning that the transmission signals 22 can pass freely. The free space 50 is additionally limited to distances of for example between 2 m and 20 m from the laser scanner 12. The distance of 20 m is indicated in dashes in FIGS. 3 to 6. For these distances, it is of interest to distinguish between rain and spray so as to be able to conclude the condition of the road therefrom. The condition of the road has an effect on an expected braking distance. By limiting the examination of the particle compositions 21 that may be present to the free space 50, any outlay, for example computational outlay and outlay in terms of time, during the performance of the method can be reduced.

The number of the corresponding particle reflection signals 30 is determined for each partial volume 48 in the free space 50. The number of the particle reflection signals 30 is normalized to the partial volume 48 and a normalized particle target density 52 is thus ascertained for each partial volume 48. In FIGS. 3 and 4, the respective particle target densities 52 are indicated with numerals, for example between 2 and 8.

Extensive investigations have shown that particle compositions 21 in the form of spray have a temporally dynamic behaviour. In contrast, particle compositions 21 in the form of rain have a behaviour that is temporally uniform as compared to spray. In partial volumes 48 in which spray prevails, the corresponding particle target density 52 differs between the measurements. In partial volumes 48 in which rain prevails, the particle target densities 52 are uniform, for example constant, during the measurements. When assessing whether a behaviour is a temporally dynamic behaviour or a temporally uniform behaviour, corresponding tolerances with respect to the particle target densities 52 can be taken into account.

Figure 5:
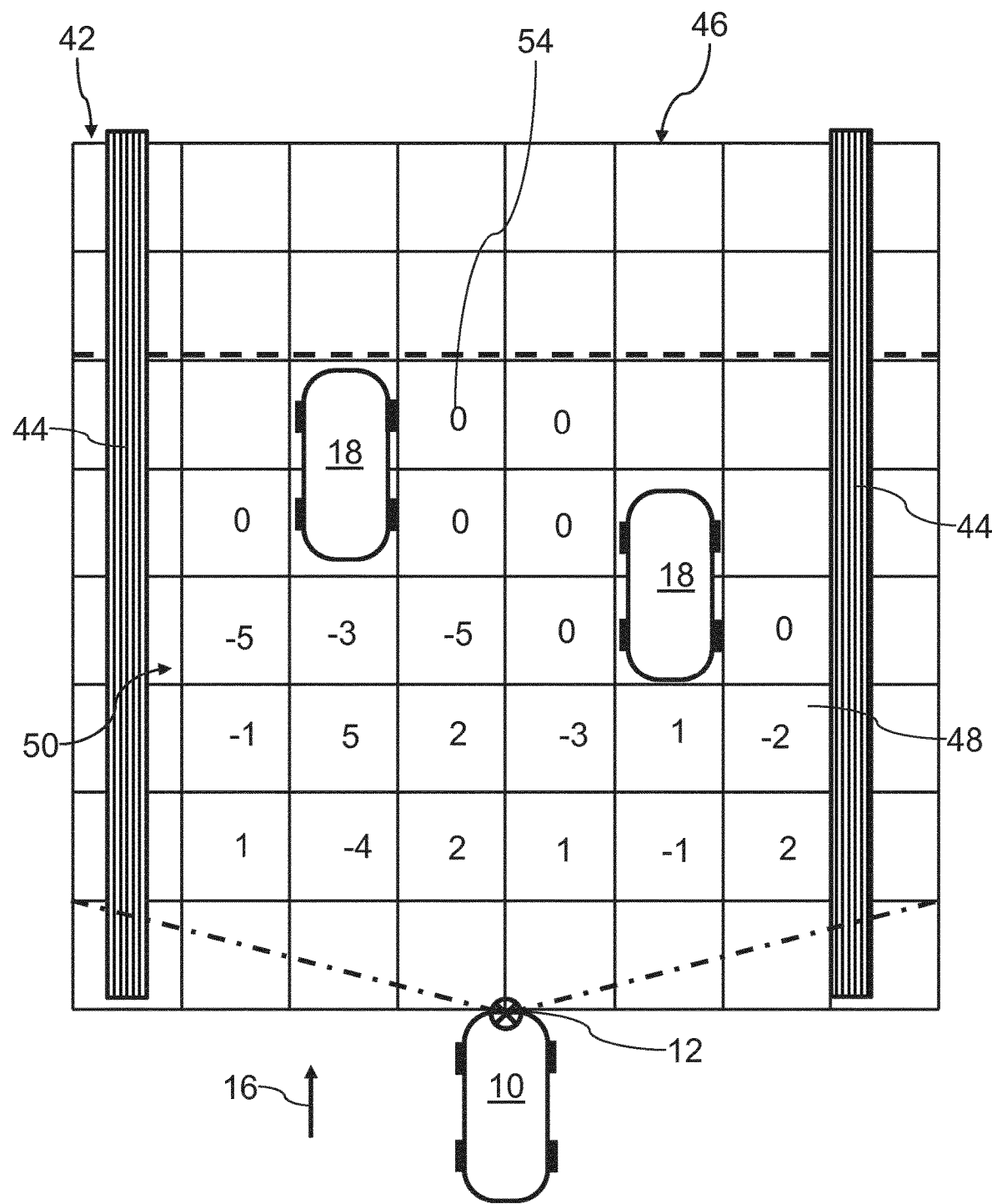
FIG. 5 shows the plan view from FIGS. 3 and 4, wherein the respective differences of the particle target densities between the two measurements from FIGS. 3 and 4 are indicated in the grid cells.

In order to ascertain the partial volumes 48 in which spray prevails and the partial volumes 48 in which rain prevails, the particle target density difference 54 of the corresponding particle target densities 52 from the two measurements from FIG. 3 and FIG. 4 is formed for each partial volume 48. The result is shown in FIG. 5. For the partial volumes 48 in which rain prevails, the particle target density difference 54 is equal to 0, for example. For the partial volumes 48 in which spray prevails, the particle target density difference 54 ranges for example between 1 and 5 and between −1 and −5.

Figure 6:
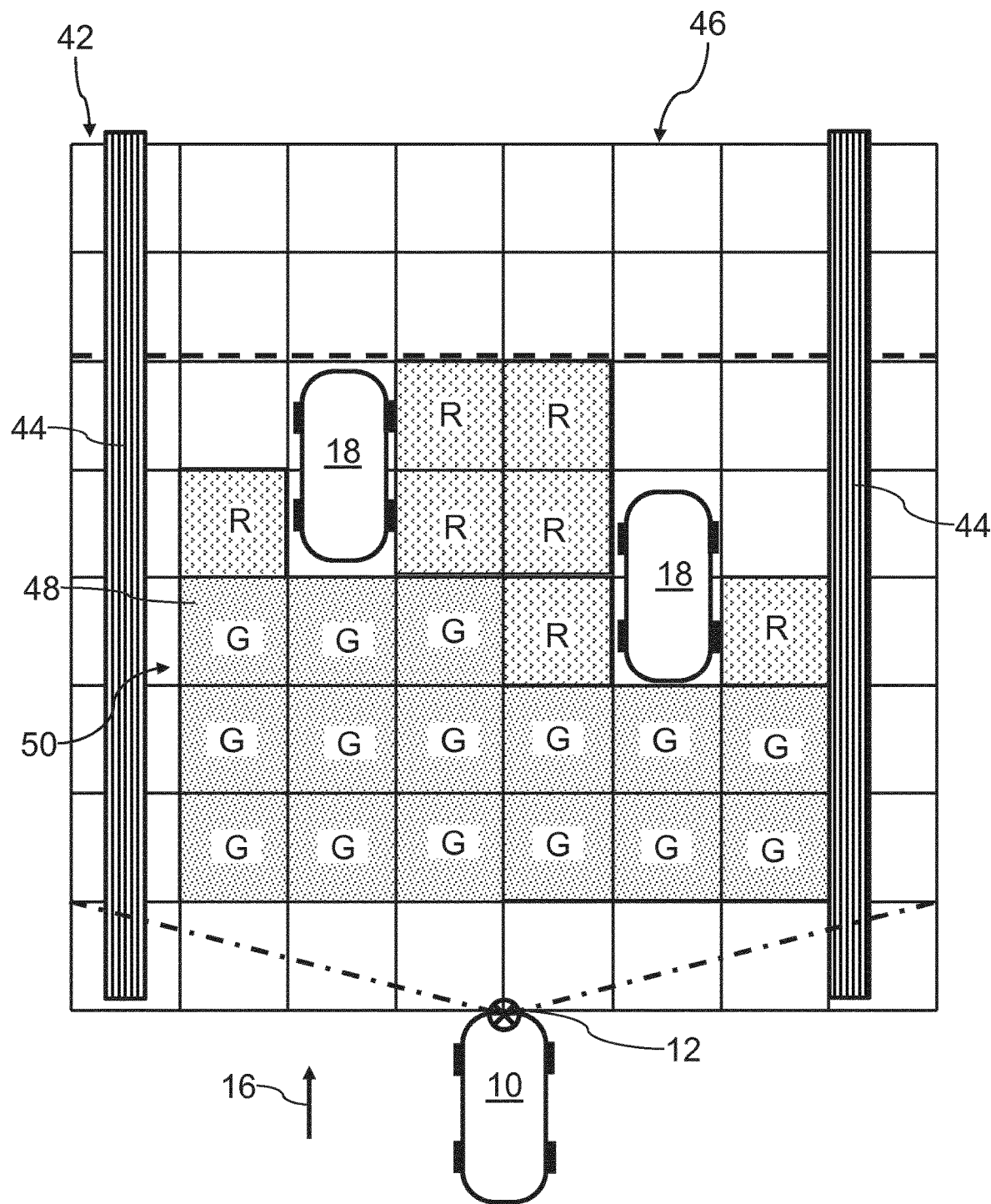
FIG. 6 shows the plan view from FIG. 5, wherein the respective grid cells are labelled as containing mainly rain "R" or mainly spray "G", depending on the differences between the particle target densities from FIG. 5.

The partial volumes 48 are labelled in the virtual grid 46 on the basis of the particle target density differences 54, as shown in FIG. 6. Here, partial volumes 48 in which rain prevails are marked "R" and partial volumes 48 in which spray prevails are marked "G". The grid 46 with the correspondingly marked partial volumes 48 aids the driving assistance system 40 as information relating to the condition of the road and the resulting influence on the expected braking distance.

Optionally, it is furthermore ascertained whether mainly rain or mainly spray prevails in the free space 50 overall.

To this end, a respective particle target density difference 54 is in each case ascertained during a plurality of measurements for the partial volumes 48 in the free space 50. A stochastic variance is formed from the particle target density differences 54. The variance is compared with a prescribed threshold value. The threshold value can be initially ascertained for example during a calibration of the laser scanner 12 and be stored in a corresponding storage medium, for example the control and evaluation device 38.

If the variance is greater than the threshold value, it is concluded that the particle reflection signals 30 from the relevant partial volumes 48 are mainly caused by particle compositions 21 having a temporally dynamic behaviour, that is to say spray in the present example. If this is not the case, it is concluded that the relevant particle reflection signals 30 are mainly caused by particle compositions 21 having a temporally uniform behaviour, that is to say rain in the present case.

This information is additionally supplied to the driver assistance system 40, so as to further improve driving safety.

The invention claimed is:

1. A method for capturing at least particle compositions in a monitoring region of a vehicle that exhibit a temporally dynamic behaviour with an optical detection apparatus of the vehicle, the method comprising, during at least one measurement,
    transmitting optical transmission signals into the monitoring region;
    receiving transmission signals that are reflected at particle targets of any particle compositions present in the monitoring region as particle reflection signals;
    determining the presence of dynamic particle compositions from the particle reflection signals,
    wherein at least two measurements are performed with a temporal distance;
    ascertaining a particle target density or a variable characterizing the particle target density for at least one partial volume of the monitoring region from the particle reflection signals of each measurement,
    wherein when the particle target density or the variable characterizing it from the at least two measurements differs by more than a prescribed tolerance, determining that the particle reflection signals from the at least one partial volume are caused by the reflection of the transmission signals at dynamic particle compositions;
    ascertaining a particle target density difference of the particle target density or a difference of the variable characterizing the particle target density for a plurality of partial volumes during a plurality of measurements;
    forming a stochastic variance based on the particle target density difference of each partial volume in the plurality of partial volumes, and
    comparing the stochastic variance with a prescribed threshold value.

2. The method according to claim 1, further comprising: when the particle target densities ascertained during the at least two measurements or variables characterizing them correspond to one another within the prescribed tolerance, determining that the particle reflection signals are caused by the reflection of the transmission signals at particle compositions having a temporally uniform behaviour.

3. The method according to claim 1, wherein for ascertaining the particle target densities or variables characterizing them, a number of particles captured during the measurements with respect to a prescribed partial volume of the monitoring region is normalized.

4. The method according to claim 1, wherein at least one portion of the monitoring region is divided into prescribed partial volumes and the particle target densities or variables characterizing them are ascertained in each case separately for the partial volumes.

5. The method according to claim 1, wherein at least one portion of the monitoring region is assigned to a virtual grid, wherein the grid cells of the grid represent partial volumes of the monitoring region.

6. The method according to claim 1, wherein the reflection signals from the monitoring region are classified at least as particle reflection signals and as object reflection signals, which are caused by objects in the monitoring region.

7. The method according to claim 1, wherein a particle target density or variable characterizing the latter is ascertained for at least one partial volume of the monitoring region located in a free space of the monitoring region from which no object reflection signals are captured that are caused by reflections of optical transmission signals at objects.

8. The method according to claim 1, wherein the monitoring region is scanned with the transmission signals during the at least one measurement.

9. The method according to claim 1, wherein particle reflection signals and possibly object reflection signals are received and converted into corresponding electrical signals that can be further processed accordingly.

10. The method according to claim 1, wherein:
when the variance is greater than the threshold value, determining that the particle reflection signals from the plurality of partial volumes are mainly caused by particle compositions having a temporally dynamic behaviour,
when the variance is not greater than the threshold value, determining that the particle reflection signals from the plurality of partial volumes are mainly caused by particle compositions having a temporally uniform behaviour.

11. An optical detection apparatus for a vehicle for capturing at least dynamic particle compositions in a monitoring region of the vehicle, the optical detection apparatus comprising:
at least one transmitter with which optical transmission signals are transmitted into the monitoring region;
at least one receiver configured to receive transmission signals that are reflected at particle targets of any particle compositions present in the monitoring region, in the form of particle reflection signals; and
at least one evaluation device with which the presence of dynamic particle compositions is determined from the particle reflection signals or variables characterizing them,
wherein the detection apparatus has means for performing the method according to claim 1.

12. The detection apparatus according to claim 11, further comprising means for scanning the monitoring region with the aid of the transmission signals.

* * * * *